Patented July 16, 1935

2,008,252

UNITED STATES PATENT OFFICE 2,008,252

METAL COMPLEX COMPOUND SOLUTION

Fritz Jostes, Frankfort-on-the-Main, Heinrich Jung, Wuppertal-Vohwinkel, and Hans Andersag, Wuppertal-Elberfeld, Germany, assignors to Winthrop Chemical Company, Inc., New York, N. Y., a corporation of New York No Drawing. Application September 30, 1933, Serial No. 691,726. In Germany October 6, 1932

9 Claims. (Cl. 167—68)

This invention relates to a composition of matter comprising in an aqueous solution a heavy metal compound in combination with an aromatic halogenylsulfamide and a complex-forming heterocyclic nitrogen compound.

The heavy metal salts of the aromatic halogenylsulfamides are valuable products in chemotherapy, particularly for combating infectious diseases. The said heavy metal salts are characterized by simultaneously displaying the efficacy of active halogen and the chemo-therapeutic action of the heavy metals. These heavy metal salts, however, have the disadvantage that they are difficultly soluble in water. Furthermore, they are only slightly stable, which properties prohibit the practical use of the said heavy metal salts for many purposes.

The present invention provides for a composition of matter in which the heavy metal salts and the active halogen are simultaneously present in a relatively stable aqueous solution which is useful for therapeutic purposes.

In accordance with the present invention relatively stable aqueous solutions containing an aromatic halogenylsulfamide and a heavy metal are obtainable by combining an aromatic halogenylsulfamide and a heavy metal selected from the group consisting of copper, silver, gold, mercury, zinc and cobalt in aqueous solution with a neutral water-soluble salt of a complex-forming heterocyclic compound containing nitrogen as hetero-member and containing at least one =NH group and at least one substituent capable of forming water-soluble salts with bases or acids while the aqueous solution is standardized to a pH of at least 7.6.

Aromatic halogenylsulfamides suitable for our new composition are preferably halogenylsulfamides of the benzene series, such as para-toluene-chlorylsulfamide and benzene-chorylsulfamide, but also halogenylsulfamides of other aromatic ring systems, such as beta-naphthalene-chlorylsulfamide have proved operable in our new composition of matter.

Furthermore, halogenylsulfamides of substituted aromatic compounds, for instance, halogen benzene-halogenylsulfamides, may be used.

The complex-forming heterocyclic component of our new composition is characterized by three essential features: 1. It must contain nitrogen as a hetero-member, 2, an =NH group which may be a member of the heterocyclic nucleus, and 3, an acid or basic group which enables the heterocyclic compound to form neutral water-soluble salts with bases or acids. Such salt-forming acid substituents are preefrably the carboxylic and sulfonic acid group. The said groups may be attached to the heterocyclic nucleus directly or by means of an aliphatic, alicyclic or aromatic radical. Another acid group useful as salt-forming substituent is, for instance, the arsonic acid group. Basic groups suitable as salt-forming substituents in the complex-forming heterocyclic components are aliphatically bound amino groups which are attached to the heterocyclic compound directly or by means of an ether-like bound oxygen or sulfur atom, or by means of an amino group. As typical representatives of the complex-forming heterocyclic components characterized above there may be mentioned by way of example imidazole derivatives, for instance, imidazolyl-alpha-amino-propionic acid; benzimidazole derivatives, such as the sulfonic and carboxylic acids; furthermore, diethylamino-ethoxy-benzimidazole, benzimidazole arsonic acid and 2-(2'-carboxyphenyl)-benzimidazole. Other suitable heterocyclic compounds of the kind specified are, for instance, pyrazole derivatives, such as methyl-pyrazole carboxylic acid; triazole derivatives, such as triazole dicarboxylic acid; benzotriazol derivatives, such as benzotriazole carboxylic acid and benzotriazole hydroxy acetic acid; pyramidine derivatives, for instance, barbituric acid and substitution products thereof, such as diethyl barbituric acid, and perimidine derivatives, such as perimidine sulfonic acid.

The solubility in water of the heavy metals specified in combination with an aromatic halogenylsulfamide and the heterocyclic nitrogen compounds of the type described above and the relative stability of such aqueous solutions obviously are effected by the formation of a complex linkage of the heavy metal with the aromatic halogenylsulfamide, on the one hand, with the heterocyclic nitrogen compound on the other hand. But we do not know what particular structure is to be attributed to such complex compounds, and, therefore, we are unable to give a structural formula of these complex compounds.

In accordance with the present invention our new aqueous solution containing a complexly bound heavy metal and active halogen in the form of an aromatic halogenylsulfamide are prepared by dissolving a heavy metal salt of an aromatic halogenylsulfamide, for instance, para-toluene-chlorylsulfamide silver of the probable formula:

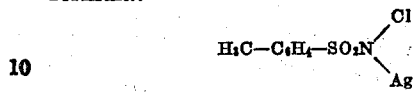

in an aqueous solution of a complex-forming heterocyclic compound as specified above, while standardizing the solution to a pH of at least 7.6 by the addition of a base, such as alkali and alkaline-earth metal hydroxides or amines, for instance, dimethylamine, diethylamine, diethylamino ethanol and piperidine. In this process the complex-forming heterocyclic component may be used in the form of its water-soluble salt with bases or acids. The aqueous solutions containing the complexly bound heavy metal and the aromatic halogenylsulfamide are also obtainable by reacting a complex compound of one of the metals specified with the complex-forming heterocyclic component upon an aromatic halogenylsulfamide in the presence of water, while again standardizing the solution to a pH of at least 7.6 as mentioned above.

Furthermore, water-soluble salts of the aromatic halogenylsulfamides, for instance, the alkali and alkaline-earth metal salts or the amine salts, the complex-forming heterocyclic compound and a salt, double salt, oxide or hydroxide of one of the heavy metals above specified may be combined in the presence of water while standardizing the solution to a pH of at least 7.6 as above indicated.

The aromatic halogenylsulfamide may be produced in the reaction mixture by using molecular quantities of the aromatic sulfamide and of a water-soluble hypochlorite, such as calcium or sodium hypochlorite.

The quantities of the components of our new composition may be varied within wide limits, but at least one mol of the complex-forming nitrogen component and at least one mol of the aromatic halogenylsulfamide should be present on each gram equivalent (atomic weight/valence of the metal) of the heavy metal. We prefer to use on one gram equivalent of the heavy metal about one mol of the aromatic halogenylsulfamide and about 3 mols of the complex-forming nitrogen compound. Alkaline or mineral acid media are preferably added in a quantity that the pH of the aqueous solution is about 8.5. Also buffer substances, such as sodium borate may be added to the solution.

The aqueous solutions thus obtainable containing a complexly bound heavy metal in combination with active halogen have proved suitable for the treatment of infectious diseases particularly those caused by ultra-visible morbific agents.

The invention is further illustrated by the following examples without being restricted thereto:—

Example 1.—30 grams of benzimidazole-5-sulfonic acid are dissolved in 165 ccs. of normal aqueous caustic soda solution and the solution obtained diluted with 200 ccs. of water. After the addition of 15 grams of para-toluene-sulfochloramide-silver the mixture is stirred until solution has taken place. If necessary, the solution is filtered and diluted with water to a concentration desired for the practical use of the solution. The solution thus obtained has a pH of 8.6 and a good stability.

When using instead of 30 grams of benzimidazole-5-sulfonic acid an equivalent quantity of benzimidazole-5-carboxylic acid (24 grams) or of benzimidazole-5-arsonic acid (36 grams), a similar solution is obtained.

Example 2.—A solution of 16.5 grams benzimidazole-5-sulfonic acid in 90 ccs. of normal caustic soda solution is successively mixed with 6 ccs. of normal caustic soda solution, a concentrated aqueous solution of 8.5 grams of para-toluene-sulfochlorylamide-sodium and an aqueous solution of 5 grams of silver nitrate while stirring. Thereafter the mixture is made up to 300 ccs. by means of water. A relatively stable solution of pH 8.4 to 8.6 is thus obtained.

When using instead of para-toluene-sulfochlorylamide-sodium the equivalent quantity of benzene-sulfobromylamide-sodium a solution of analogous properties is obtained.

Example 3.—An aqueous solution of 5 grams of copper-benzimidazole-5-sulfonic acid-sodium is mixed with a solution of 4 grams of benzimidazole-5-sulfonic acid in 20 ccs. of normal caustic soda solution. After the addition of 5.6 grams of para-toluene-sulfochlorylamide-sodium in a concentrated aqueous solution, the mixture is made up for practical use to 250 ccs. by means of water. A deep blue solution is obtained.

Example 4.—An aqueous solution of 7.1 grams of sodium-mercury-6-chlorobenzimidazole-5-sulfonate is mixed with 10 ccs. of normal caustic soda solution and a solution of 5.2 grams of 6-chlorobenzimidazole-5-sulfonic acid in 20 ccs. of normal caustic soda solution. A concentrated aqueous solution of 5.6 grams of para-toluene-sulfochlorylamide-sodium is added while stirring and the solution made up to 350 ccs. by means of water.

Example 5.—The solution of 30 grams of benzimidazole-5-sulfonic acid in 150 ccs. of normal caustic soda solution is successively mixed with concentrated aqueous solutions of 1.4 grams of para-toluene-sulfochlorylamide-sodium and 5.9 grams of cobalt chloride (6 H2O) while stirring. A violet colored solution is thus obtained which for practical use is made up to 300 ccs. by means of water.

Example 6.—A solution of 15 grams of benzimidazole-5-sulfonic acid in 105 ccs. of normal caustic soda solution is mixed with an aqueous solution of 7 grams of para-toluene-sulfochlorylamide-sodium. 34.5 ccs. of a 10% solution of chlorauric acid are added while stirring and the solution is made up to 200 ccs. by means of water. A gold-yellow solution is thus obtained.

When using instead of 15 grams of benzimidazole-5-sulfonic acid 12 grams of benzotriazole-5-carboxylic acid or 12 grams of triazole-dicarboxylic acid similar solutions are obtained.

Example 7.—A solution of 9.7 grams of benzotriazole-5-hydroxy acetic acid in 85 ccs. of normal caustic soda solution is mixed with the aqueous solutions of 5 grams of para-toluene-sulfochlorylamide-sodium and 2.25 grams of copper sulfate (5 H2O) while stirring. The mixture is then made up to 200 ccs. by means of water, whereupon a temporarily formed precipitate is gradually dissolved on further stirring. A green-blue solution is thus obtained.

When using instead of 9.7 grams of benzotriazole-5-hydroxy acetic acid 7.8 grams of alpha-amino-beta-imidazolyl-propionic acid a similar solution is obtained.

*Example 8.*—An aqueous solution of 9.2 grams of diethyl-barbituric acid in 72.5 ccs. of normal caustic soda solution is mixed with the aqueous solutions of 5 grams of para-toluene-sulfochlorylamide-sodium and 2.45 grams of mercury chloride while stirring. For practical use the solution is made up to 130 ccs. by means of water. A colorless solution is thus obtained.

*Example 9.*—5.95 grams of benzene-sulfamide are dissolved in 35 ccs. of normal caustic soda solution and 15 ccs. of water and 25 ccs. of a 12% sodium hypochlorite solution are added while cooling with ice. A solution of 15 grams of benzimidazole-5-sulfonic acid in 75 ccs. of normal caustic soda solution and an aqueous solution of 5.4 grams of zinc sulfate are added and the solution is made up to 190 ccs. by means of water. A colorless solution is thus obtained.

*Example 10.*—A solution of 30 grams of benzimidazole-5-sulfonic acid in 225 ccs. of normal caustic soda solution is mixed with 13 grams of para-toluene-sulfamide and a 20% aqueous solution of 9.4 grams of copper-sulfate (5 $H_2O$). Thereafter 50 ccs. of a 12% sodium-hypochlorite solution are gradually added while cooling, whereupon the precipitate first formed is dissolved. The deep blue solution is made up to 400 ccs. by means of water.

When using instead of 30 grams of benzimidazole-5-sulfonic acid 37.5 grams of perimidine sulfonic acid of the formula:

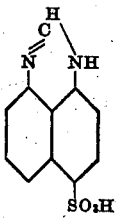

a similar solution is obtained.

*Example 11.*—A solution of 11.7 grams of 5-diethylaminoethoxy-benzimidazole in 50 ccs. of normal hydrochloric acid is mixed with 2.36 grams of para-toluene-sulfochlorylamide-copper (prepared by precipitating a solution of para-toluene-sulfochlorylamide-sodium by means of copper sulfate) while cooling and stirring. A deep blue-green solution is obtained.

*Example 12.*—15 grams of naphthalene-beta-sulfochlorylamide-silver are dissolved in a mixture of a solution of 30 grams of benzimidazole-5-sulfonic acid in 155 ccs. of normal caustic soda solution and 200 ccs. of water while stirring. Thereupon the solution is diluted with water to 700 ccs. A nearly colorless, relatively stable solution is thus obtained.

When using instead of 30 grams of benzimidazole-5-sulfonic acid 19 grams of methyl-pyrazole-carboxylic acid a solution displaying similar properties is obtained.

We claim:—

1. Composition of matter comprising in aqueous solution, a complex compound composed of an aromatic halogenylsulfamide substituted by a heavy metal selected from the group consisting of copper, silver, gold, mercury, zinc and cobalt, and of a heterocyclic compound containing nitrogen as hetero-member and containing at least one =NH group and at least one group capable of forming water-soluble salts, which aqueous solution has been standardized to a pH of at least 7.6.

2. Composition of matter comprising in aqueous solution a complex compound composed of an aromatic halogenylsulfamide substituted by a heavy metal selected from the group consisting of copper, silver, gold, mercury, zinc and cobalt, and of a benzimidazole derivative containing at least one acid substituent capable of forming water-soluble salts, which aqueous solution has been standardized to a pH of at least 7.6.

3. Composition of matter comprising in aqueous solution a complex compound composed of an aromatic halogenylsulfamide silver compound and of a heterocyclic compound containing nitrogen as hetero-member and containing at least one =NH group and at least one group capable of forming water-soluble salts, which aqueous solution has been standardized to a pH of at least 7.6.

4. Composition of matter comprising in aqueous solution a complex compound composed of a halogenysulfamide of the benzene series substituted by a heavy metal selected from the group consisting of copper, silver, gold, mercury, zinc and cobalt, and of a heterocyclic compound containing nitrogen as hetero-member and containing at least one =NH group and at least one group capable of forming water-soluble salts, which aqueous solution has been standardized to a pH of at least 7.6.

5. Composition of matter comprising in aqueous solution a complex compound composed of a chlorylsulfamide of the benzene series substituted by a heavy metal selected from the group consisting of copper, silver, gold, mercury, zinc and cobalt, and of a heterocyclic compound containing nitrogen as hetero-member and containing at least one =NH group and at least one group capable of forming water-soluble salts, which aqueous solution has been standardized to a pH of at least 7.6.

6. Composition of matter comprising in aqueous solution a complex compound composed of a chlorylsulfamide-silver compound of the benzene series, and of a benzimidazole derivative containing at least one acid substituent capable of forming water-soluble salts, which aqueous solution has been standardized to a pH of at least 7.6.

7. Composition of matter comprising in aqueous solution a complex compound composed of para-toluene-chlorylsulfamide-silver and of a benzimidazole derivative containing at least one acid substituent capable of forming water-soluble salts, which aqueous solution has been standardized to a pH of at least 7.6.

8. Composition of matter comprising in aqueous solution a complex compound composed of para-toluene-chlorylsulfamide-silver and of an alkali metal benzimidazole sulfonate, which aqueous solution contains alkali metal hydroxide to a pH of at least 7.6.

9. Composition of matter comprising in aqueous solution a complex compound composed of para-toluene-chlorylsulfamide-silver and of sodium benzimidazole-5-sulfonate, which aqueous solution contains sodium hydroxide to a pH of about 8.5.

FRITZ JOSTES.
HEINRICH JUNG.
HANS ANDERSAG.